(12) United States Patent
Sharma et al.

(10) Patent No.: US 8,015,239 B2
(45) Date of Patent: *Sep. 6, 2011

(54) METHOD AND SYSTEM TO REDUCE FALSE POSITIVES WITHIN AN AUTOMATED SOFTWARE-TESTING ENVIRONMENT

(75) Inventors: Anoop Sharma, Union City, CA (US); Makarand Kulkarni, Sunnyvale, CA (US); I-Chin Chen, San Jose, CA (US); Nadir Hussain, Palo Alto, CA (US); Corey Innis, San Francisco, CA (US)

(73) Assignee: eBay Inc., San Jose, CA (US)

( * ) Notice: Subject to any disclaimer, the term of this patent is extended or adjusted under 35 U.S.C. 154(b) by 2087 days.

This patent is subject to a terminal disclaimer.

(21) Appl. No.: 10/969,738

(22) Filed: Oct. 19, 2004

(65) Prior Publication Data
US 2006/0085132 A1    Apr. 20, 2006

(51) Int. Cl.
*G06F 15/16* (2006.01)

(52) U.S. Cl. ........ 709/202; 709/203; 709/217; 709/218; 709/219

(58) Field of Classification Search ................. 709/202, 709/203, 217–219
See application file for complete search history.

(56) References Cited

U.S. PATENT DOCUMENTS

| | | | |
|---|---|---|---|
| 6,549,944 B1 | 4/2003 | Weinberg et al. | |
| 7,231,606 B2 * | 6/2007 | Miller et al. | 715/738 |
| 7,313,564 B2 | 12/2007 | Melamed et al. | |
| 7,444,548 B2 * | 10/2008 | Shane | 714/38.14 |
| 7,568,025 B2 * | 7/2009 | Vasudeva | 709/224 |
| 7,617,486 B2 | 11/2009 | Sharma et al. | |
| 7,634,549 B1 * | 12/2009 | Ghaisas et al. | 709/220 |
| 7,757,175 B2 * | 7/2010 | Miller | 715/738 |
| 2004/0172253 A1 | 9/2004 | Singh | |
| 2006/0020699 A1 * | 1/2006 | D'Esposito | 709/224 |
| 2006/0101403 A1 | 5/2006 | Sharma et al. | |
| 2006/0217930 A1 * | 9/2006 | Chang et al. | 702/186 |
| 2007/0234217 A1 * | 10/2007 | Miller et al. | 715/738 |
| 2008/0288364 A1 * | 11/2008 | Harris | 705/26 |
| 2009/0307665 A1 | 12/2009 | Sharma et al. | |

OTHER PUBLICATIONS

"U.S. Appl. No. 10/969,736, Final Office Action mailed Mar. 31, 2009", 23 pgs.
"U.S. Appl. No. 10/969,736, Non-Final Office Action mailed Oct. 8, 2008", 18 pgs.
"U.S. Appl. No. 10/969,736, Notice of Allowance mailed Jun. 30, 2009", 8 pgs.
"U.S. Appl. No. 10/969,736, Response filed Jan. 8, 2009 to Non-Final Office Action mailed Oct. 8, 2008", 18 pgs.
"U.S. Appl. No. 10/969,736, Response filed Jun. 1, 2009 to Final Office Action Mar. 31, 2009", 10 pgs.

* cited by examiner

*Primary Examiner* — Mohamed Wasel
(74) *Attorney, Agent, or Firm* — Schwegman, Lundberg & Woessner, P.A.

(57) ABSTRACT

A method and system to reduce false positives within an automated software-testing environment using a comparator module, a filter application module, and a preview generator module is provided. In one exemplary embodiment, a method within a testing system for testing web pages associated with a current version website by automatically generating filter data by comparing differences between a plurality of iterations of a test case executed on a previous version website, automatically generating error data by executing the test case on the current version website, and detecting differences between the previous version and the current version of the website by applying filtering rules within the filter data to the error data to remove false positives.

21 Claims, 15 Drawing Sheets

1. category   2. title & direction   3. pictures & detail   4. payment & shipping   5. review & submit

Payment methods * required
Choose payment method you'll accept from buyers
- money order/cashiers check
- personal check
- other - see payment instructions Seller's payment address
Shown in checkout
1234 Main Street
Anytown, USA 12345

Shipping costs
specify domestic shipping costs now?
- Yes, describe my package
- Yes, provide flat rate
- No, have buyers contact me ~~You can help~~ avoid having buyers ~~calculate~~ enter the wrong shipping cost. Provide the shipping cost now and it will be automatically ~~by describing~~ pre-filled for your ~~package in the shipping calculator~~ buyers.

Shipping Resources

| Shipping Center | Shipping Center delivery confirmation of your Service Items | Find drop off locations for shipments | Ship 150 lbs+ items at the Freight Resource Center |

METHOD AND SYSTEM TO REDUCE FALSE POSITIVES WITHIN AN AUTOMATED SOFTWARE-TESTING ENVIRONMENT

FIELD OF THE INVENTION

Exemplary embodiments of the present invention relate generally to the technical field of software testing automation and, in one exemplary embodiment, to methods and systems to reduce false positives within an automated software-testing environment using a comparator module, a filter application module, and a preview generator module.

BACKGROUND OF THE INVENTION

Websites have become increasingly complex venues for commerce (e.g., the buying and selling of goods and services over the Internet) and now include interactive functionality and sophistication that allows communication between users and a variety of databases. As such, it has become increasingly difficult to manage transitions from one software revision of a website to another software revision of the website without the use of engineers that test quality and stability of the website prior to release. Often times, testing a portion of a website affects operations within a remainder of the website because changing parameters and variables of the portion may affect the input variables of the remainder (e.g., new code can sometime break old functionality because files being changed have input and output parameters that affect the stability of the remainder). Furthermore, multiple engineers may work on the same portion of software code and a particular engineer may inadvertently modify a parameter that will affect the stability of the remainder (e.g., an engineering team may be focused on solving one problem, and may inadvertently create new problems by changing parameters that are required by another portion of software code associated with the website).

Technology to aid testing of software revisions of websites has largely been limited to external testing tools that require an engineering team to learn a special programming language to define what aspects of the website will be tested (e.g., SILKCENTRAL™ Test Manager by Segue Software, Inc., and MERCURY WINRUNNER™ by Mercury Interactive, Inc.), and internally developed testing systems that are dependent upon manually testing all aspects of a software revision prior to release. External testing tools require that a website owner hire specialized engineers that are trained in specialized programming languages associated with the external tools. Furthermore, external tools cannot test aspects (e.g., physical locations of images, text, or input boxes on a web page) of a software revision that have not been hard coded as candidates for testing (e.g., an engineer must predetermine which aspects of a website are to be tested and hard code instructions for testing the predetermined aspects). Manual offline testing systems are error prone because engineers may not be able to test all aspects of a software revision prior to release (e.g., engineers may make a mistake, or may not have the manpower needed to test every aspect of a website).

In order to make software testing systems more efficient, there is some incentive for operators to provide systems for automating the testing of software revisions associated with websites without the use of external testing tools that require hard coding of testing candidates, and without hiring specialized engineers that are trained in specialized programming languages associated with the external tools. However, the design of such software testing systems present a number of technical challenges, specifically relating to which data is examined as a testing candidate, how to reduce the number of false positives if HTML data is used as the testing candidate, how accuracy is maintained, and how hardware architecture is designed and/or implemented to manage automated software testing systems.

SUMMARY OF THE INVENTION

A method and system to reduce false positives within an automated software-testing environment using a comparator module, a filter application module, and a preview generator module is provided. In one aspect, a method within a testing system for testing web pages associated with a current version website by automatically generating filter data by comparing differences between a plurality of iterations of a test case executed on a previous version website, automatically generating error data by executing the test case on the current version website, and detecting differences between the previous version and the current version of the website by applying filtering rules within the filter data to the error data to remove false positives. In one aspect, a merged image file may also be generated by overlaying an inverted image file of a first web page associated with the previous version website, and a non-inverted image file of a second web page associated with a current version website.

The invention extends to a machine-readable medium storing a set of instructions that, when executed by the machine, cause the machine to perform any one or more of the methods described herein.

Other features of the present invention will be apparent from the accompanying drawings and from the detailed description that follows.

BRIEF DESCRIPTION OF THE DRAWINGS

The present invention is illustrated by way of example and not limitation in the figures of the accompanying drawings, in which like references indicate similar elements and in which:

FIG. 7 is a user interface diagram illustrating an exemplary user interface (UI) for initiating a test case within the testing device, according to one exemplary embodiment.

FIG. 11 is a user interface diagram illustrating an exemplary difference view generated by a testing device, according to one exemplary embodiment.

DETAILED DESCRIPTION

A method and system to reduce the number false positives within an automated software-testing environment using a comparator module, a filter application module, and a preview generator module are described. In one exemplary embodiment, a method within a testing system (e.g., a testing device) for testing web pages associated with a current version website by automatically generating filter data by comparing differences between a plurality of iterations of a test case executed on a previous version website, automatically generating error data by executing the test case on the current version website, and detecting differences between the previous version and the current version of the website by applying filtering rules within the filter data to the error data to remove false positives. In another embodiment, a merged image file may be generated by overlaying an inverted image file of a first markup language document (e.g., a web page) associated with the previous version website, and a non-inverted image file of a second markup language document associated with a current version website.

In the following description, for purposes of explanation, numerous specific details are set forth in order to provide a thorough understanding of an embodiment of the present invention. It will be evident, however, to one skilled in the art that the present invention may be practiced without these specific details.

Figure 1:
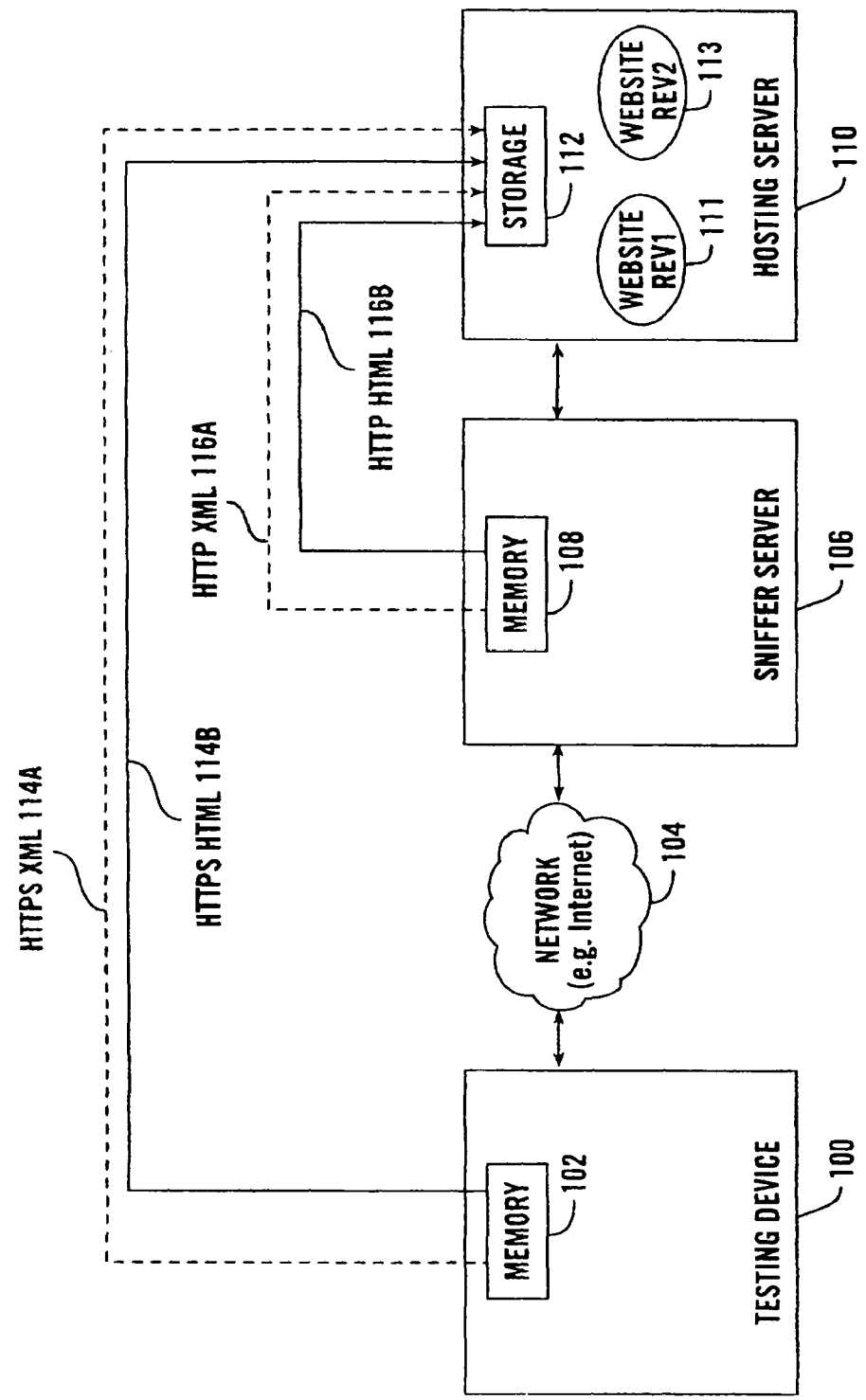
FIG. 1 is a block diagram illustrating a system having a testing device, a sniffer server, and a hosting server to test programming code associated with a website.

FIG. 1 is a block diagram illustrating a system having a testing device 100, a sniffer server 106 that performs a sniffing function (e.g., captures representation data) for unencrypted web pages, and a hosting server 110 to test programming code associated with a website. The testing device 100 communicates with the sniffer server 106 and the hosting server 110 through a network 104. In one embodiment, the network 104 may be the Internet. The testing device 100 includes memory 102. The memory 102 may for example be random access memory or other volatile or nonvolatile memory. An exemplary test case may include a set of operations that define a sequence of actions a user of a website may perform (e.g., a particular test case may include a representation of actions that a typical user would take to bid on an item on a commerce website for example). Testing representations of encrypted web pages associated with a test case for a website (e.g., HTTPS XML 114A and HTTPS HTML 114B) are stored within memory 102 of the testing device 100. (e.g., the memory 102 may store testing representations of encrypted web pages when a user initiates a test case for the website 111). In contrast, testing representations of unencrypted web pages associated with the test case for the website (e.g., HTTP XML 116A and HTTP HTML 116B) are stored within a memory 108 of the sniffer server 106 so that multiple test cases can simultaneously be performed, as will later be described with reference to FIG. 3. In one embodiment, an HTTPS XML representation 114A and an HTTP XML representation 116A includes commands for regenerating the actions (e.g. movements) or operations of the user on the website 111 (e.g., movements of a user may be regenerated when the test case is automatically rerun within testing device 100). The HTTPS HTML representation 114B and HTTP HTML representation 116B may include source code of individual web pages visited within the website 111. It should be noted that the HTTPS XML 114A and HTTPS HTML 114B, as well as the HTTP XML 116A and HTTP HTML 116B may be communicated through network 104. Furthermore, in another embodiment, the sniffer server 106 and/or the testing device 100 stores all XML data required to generate the XML document for both unencrypted and/or encrypted web pages.

Figure 2:
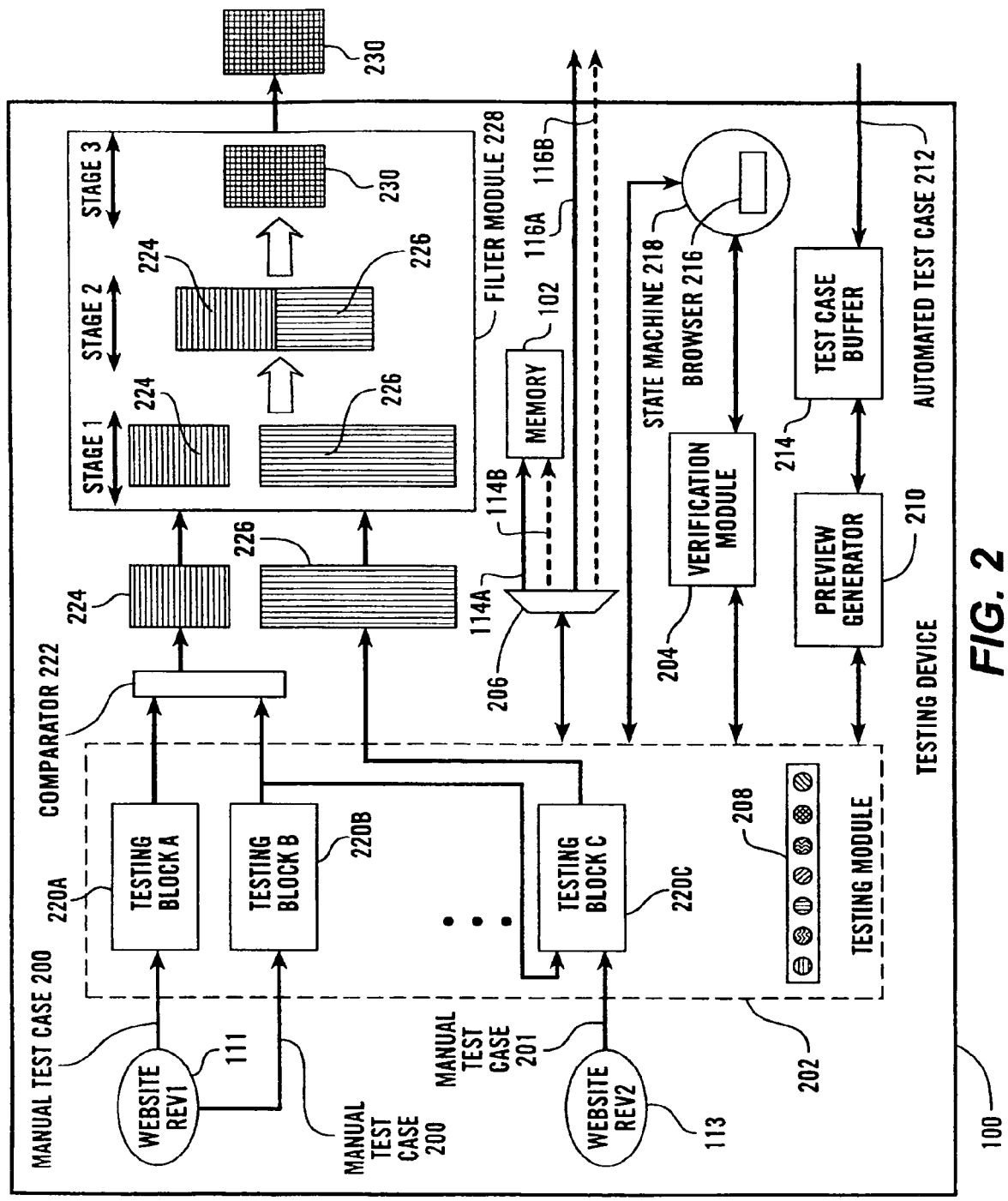
FIG. 2 is a block diagram illustrating a zoom view of the testing device having a toolbar, a comparator, and a filter module, according to one exemplary embodiment.

FIG. 2 is a block diagram illustrating a zoom view of the testing device 100 having a toolbar interface 208, a comparator module 222, and a filter module 228 according to one exemplary embodiment. The testing device 100 in FIG. 2 illustrates the use of a filter module 228 for creating a difference report 230. A website 111 and a website 113 as shown in FIG. 2 may be used as candidates for testing by the testing module 202. Each of the websites 111 and 113 need not be an entire web site, and may only be portions of a website (e.g., content and/or code associated with a website, such as web page source code for a subset of the web site). In one embodiment, the website 113 may be a newer version of the website 111. In another embodiment, the website 111 and the website 113 may be stored within a hosting server 110 as shown in FIG. 1.

A manual test case 200 may be performed for the website 111 once within a testing block 220A and again within a testing block 220B (e.g., the manual test case 200 may include a series of operations that a quality engineer manually performs on the testing device 100 such as simulating actions a user may perform in creating a listing). In one embodiment, the results of the manual test case 200 performed within testing block 220A are automated and an automated version of the manual test case 200 may be performed automatically within testing block 220B (e.g., by running the automated test case through state machine 218). As such, in one embodiment, the testing block 220A may be used to perform the manual test case 200 whereas the testing block 220B may be used to perform an automated test case 212 using XML code saved from the manual test case 200. The results of test cases run for the manual test case 200 within testing block 220A and the testing block 220B are then transmitted to the comparator module 222.

The comparator module 222 compares code (e.g., the HTML code representing each web page visited during the manual test case 200) generated by the testing block 220A and the testing block 220B and generates a filter data, in the exemplary form of a filter report 224. The filter report 224 may be a report of a comparison between source code (e.g., HTML source code) for web pages visited by a user (e.g., a quality-assurance engineer) who has performed the manual test case 200 on the website 111 using the testing block 220A and the testing block 220B. As such, the filter report 224 may show the differences between two test cases that were manually performed within the testing block 220A and the testing block 220B for the website 111. In one embodiment, the filter report 224 may be created by comparing differences between a plurality of iterations of a test case executed on a previous version website. It should be noted that the test cases performed within the testing block 220A and the testing block 220B may be for the exact same version website 111, and may be the exact test case so as to provide an accurate filter report 224 that only includes dynamic data rather than errors within programming code. The filter report 224 may therefore include data that can be ignored because the data may not be an error within in the programming code of website 111 but rather dynamic data which can change (e.g., such as day/time, user name, etc.).

Next, a manual test case 201 may be performed for a newer version website 113 within testing block 220C. Testing block 220C may receive automated testing instructions from testing block 220B for portions of the programming code within the newer version website 113 that are the same as the programming code within the older version website 111. In one embodiment, a XML code generated for the manual test case 200 performed on the website 111 within either the testing block 220A and/or within the testing block 220B may be used to perform the manual test case 201 automatically for portions of the website 113 programming code that is common with the website 111 programming code (e.g., the test case may be automated and performed through state machine 218, so as to save time and prevent human error). As illustrated in FIG. 2, an automated test case may be received from the output of testing block 220B into the input of testing block 220C, in addition to the manual test case 201 input. As such, the portion of programming code of the website 113 that is common with the website 111 may be automatically performed within testing block 220C. In contrast, different code (e.g., newer code developed for a newer version website 113, which is not the same as the programming code within the older version website 111) is manually performed through the manual test case 201. If there are any errors (e.g., errors may be differences between the same web page viewed during testing of the previous version website 111 as viewed during testing of the current website version 113) that occur during the testing of the website 113, error data, in the exemplary form of an error report 226 may be generated. In one embodiment, the error report 226 includes only differences between the mark-up language source code for the same web page viewed during the manual test case 200 on the previous website 111 and the mark-up language source code for the same web page viewed during the manual test case 201 on the current website 113. For example, the error report 226 may include only differences between web pages that should be the exact same (e.g., but have differences because of errors in the programming code) between two different revisions of the same website.

The filter report 224 and the error report 226 are both transmitted to a filter module 228 that transforms these two reports into a difference report 230. There are three stages illustrated within the filter module 228 as shown in FIG. 2. During stage 1, the filter report 224 and the error report 226 are each prepared in a format that can be easily compared (e.g., font sizes may be adjusted, data formats may be converted, source code errors may be removed, etc.). In one embodiment, the filter report 224 and the error report 226 are examined so as to determine any ignorable errors within the reports. Next, during stage 2, the filter report 224 and the error report 226 are automatically concatenated on top of each other, so as to perform a comparison between these two reports. In one embodiment, rather than concatenation, the filter report 224 and the error report 226 are compared so as to remove false positives within the filter report 224 from the error report 226. In another embodiment, the filter report 224 includes business rules that are applied to the error report 226. (e.g., rules that govern what aspects of the source code within the error report 226 can be ignored).

In stage 3, the errors within the filter report 224 are subtracted from the error report 226 to generate difference data, in the exemplary form of a difference report 230. In one embodiment, business rules within the filter report 224 are applied to the error report 226 to generate the difference report 230. In another embodiment, the filter module 228 generates a difference report 230 by removing the false positives identified within the filter report 224 from the error report 226 (e.g., the false positives may be errors which are not actual errors within the programming code but merely indicators of dynamic data that has been pre-designed into the source code).

In one embodiment, in Stage 3 in FIG. 2, the difference report 230 may be the error report 226 having the business rules within the filter report 224 subtracted from it. The difference report 230 includes the source code differences between the website 111 and the website 113 that are actual errors within the programming code rather than ignorable false positives (e.g., false positives may include ignorable dynamic data such as time, date, and user name information that has been purposefully associated with source code). As such, the false positives may be removed by applying the business rules within the filter report 224 to the error report 226.

The testing device 100 also includes a testing module 202 having a toolbar interface 208, a verification module 204, an output generator 206, a preview generator 210, a test case buffer 214, a state machine 218 having a browser 216, and the memory 102. A manual test case 200 may be initiated by a user of the testing device 100 (e.g., a quality-assurance engineer) to perform testing of a first version of website 111 as shown in FIG. 1 in one embodiment. The testing module 202 may record operations (e.g., movements) and operations of the user as he/she navigates using a browser application 216 to generate representations (e.g., 114A-114B, and 116A-116B as previously discussed) of the manual test case 200. The testing module 202 may also change proxy settings within the testing device 100 to receive the website 111 from the sniffer server 106 (as shown in FIG. 1) rather than the hosting server 110 to allow for simultaneous testing as will later be described in FIG. 3.

Figure 12:
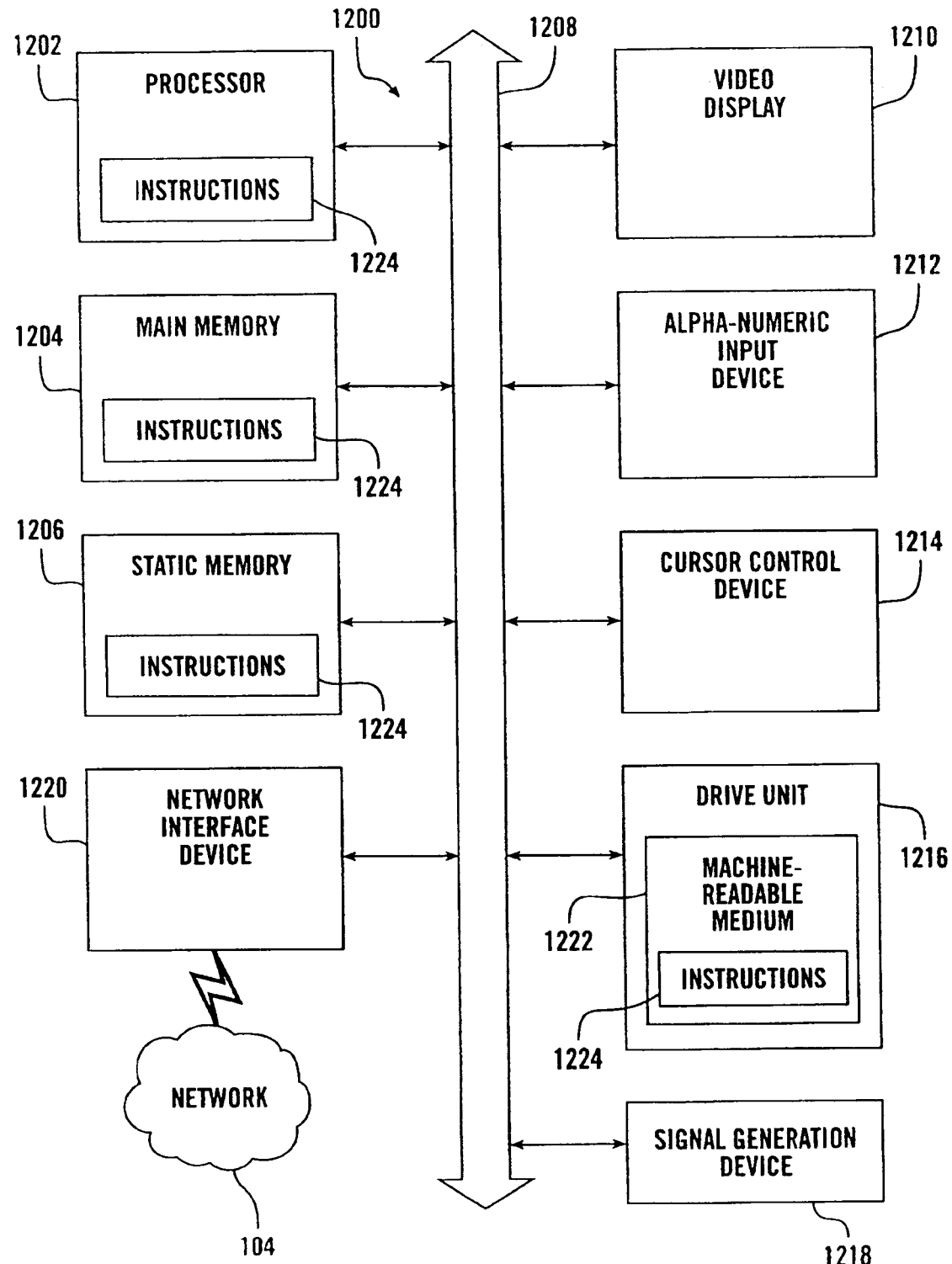
FIG. 12 is a diagrammatic representation of machine in the exemplary form of a computer system, according to one exemplary embodiment.

As noted above, the testing module 202 may include a toolbar interface 208. The toolbar interface 208 may be presented by a browser application 216 within state machine 218. The state machine 218 may be a computer system 1200 as illustrated in FIG. 12. The functions that can be invoked utilizing the toolbar interface 208 will be described later in detail with respect to FIG. 5. The testing module 202 may interact with the verification module 204 if a user selects additional information (e.g., additional keywords or a variable database value that the user wishes to include within the test case) to save within a test case associated with the representations 114A-114B and 116A-116B. In one embodiment, a user might test the functionality of a website by pressing buttons on the toolbar interface 208 within a browser application, as illustrated in FIG. 6. After the movements of a user performing the manual test case 200 are recorded using the testing module 202 (and optionally the verification module 204), the output generator 206 prepares representations of the test case.

The output generator 206 in FIG. 2 divides the representations of encrypted web pages (e.g., HTTPS web pages) and unencrypted web pages (e.g., HTTP web pages) so that encrypted representations 114A and 114B are stored within a memory (e.g., a local memory 102) accessible by the testing device 100, and unencrypted representations 116A and 116B are transferred to a further memory (e.g., a memory 108 within the sniffer server 106) through network 104 (e.g., as illustrated in FIG. 1). The encrypted representation 114A and unencrypted representation 116A may be XML code (e.g., extensible markup language including customized tags, enabling the definition, transmission, validation, and interpretation of data between applications and/or iterations of a test case) for regenerating the operations (e.g., movements) of a user during manual test case 200. The encrypted representation 114B and unencrypted representation 116B may be HTML code that includes source code of individual web pages visited during manual test case 200.

Figure 5:
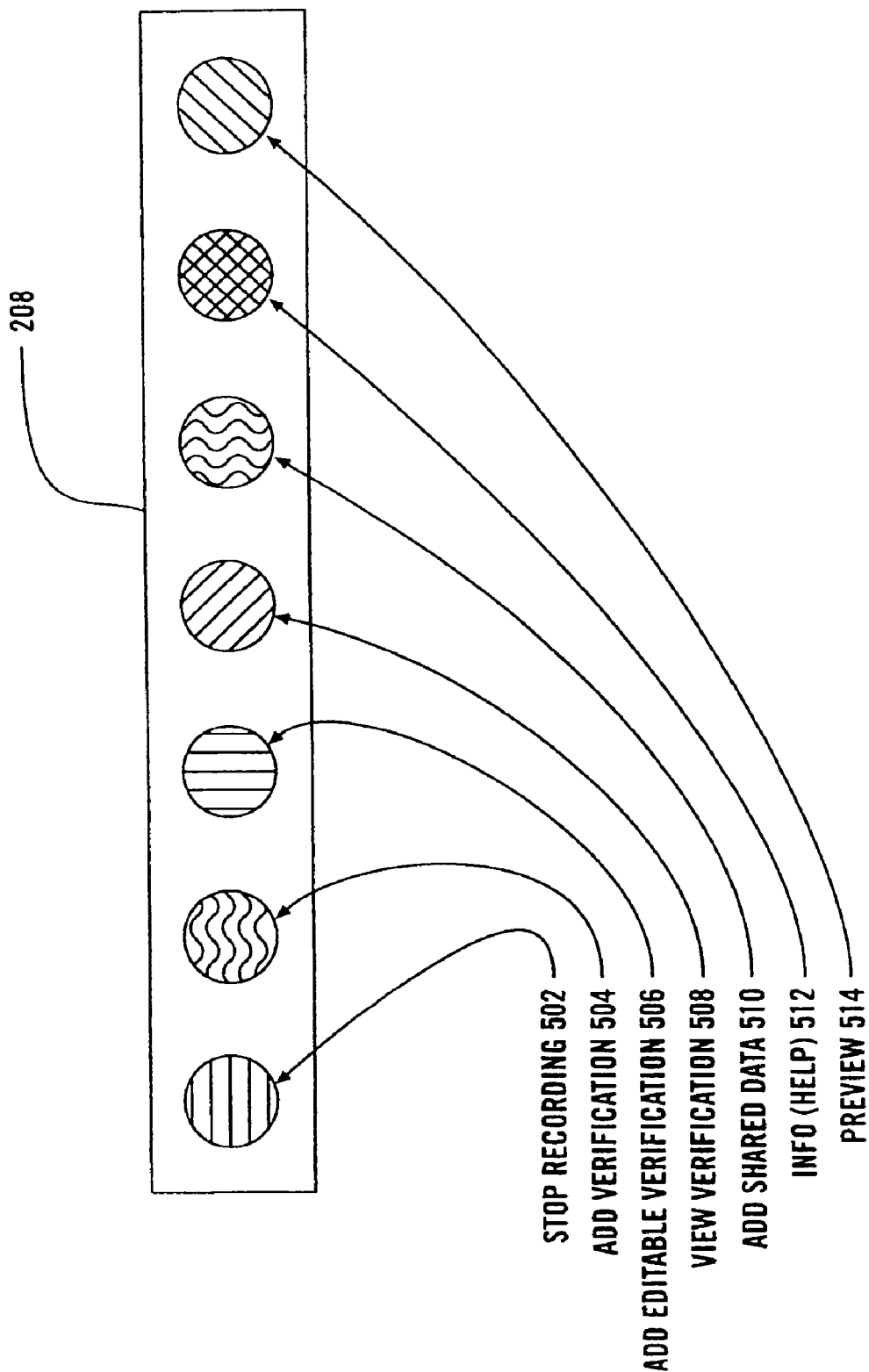
FIG. 5 is a user interface diagram illustrating a functional view of the toolbar, according to one exemplary embodiment.
Figure 6:
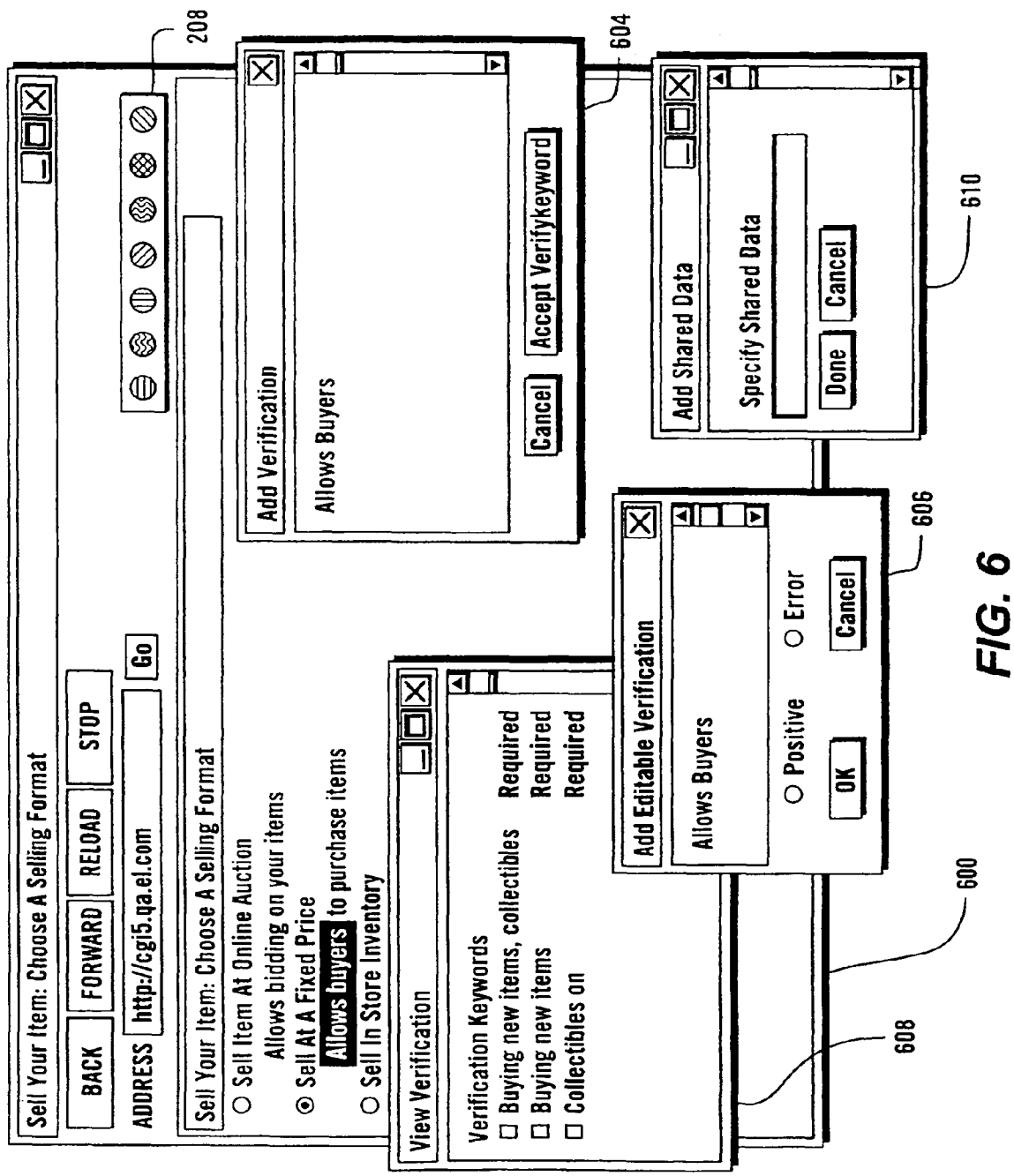
FIG. 6 is a user interface diagram illustrating an exemplary user interface (UI) of an activated toolbar, according to one exemplary embodiment.

In FIG. 2, the toolbar interface 208 of the testing module 202 may include a user selectable indicia or other user-selectable mechanism (e.g., the stop recording button 502 as shown in FIG. 5), which when selected by the user may operate to terminate a recording process, and to transfer the representations 114A-114B and 116A-116B from the testing device 100 and the sniffer server 106 respectively to a storage device 112 within the hosting server 110 (e.g., as illustrated in FIG. 1). Collectively, the representations 114A-14B and 116A-116B of the manual test case 200 may form an automated test case 212 (e.g., a new version of website 111, such as website 113 in FIG. 1 may not require manual entry of a test case by a user). The automated test case 212 may be stored within the storage device 112 within the hosting server 110 as illustrated in FIG. 1. After the manual test case 200 has been performed once, subsequent tests of a website 111 may be performed automatically by running the automated test case 212.

Figure 3:
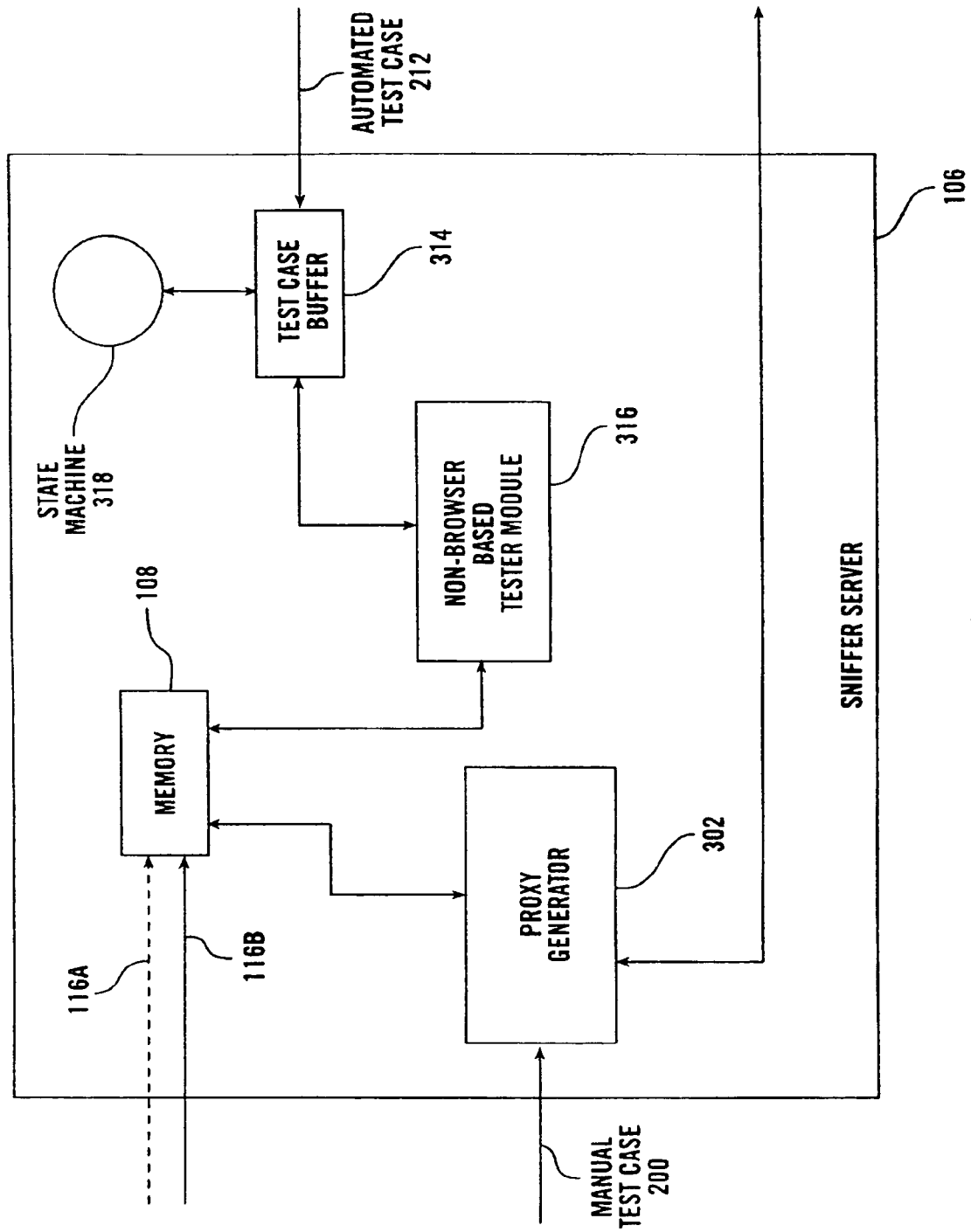
FIG. 3 is a block diagram illustrating a zoom view of the sniffer server, according to one exemplary embodiment.
Figure 10:
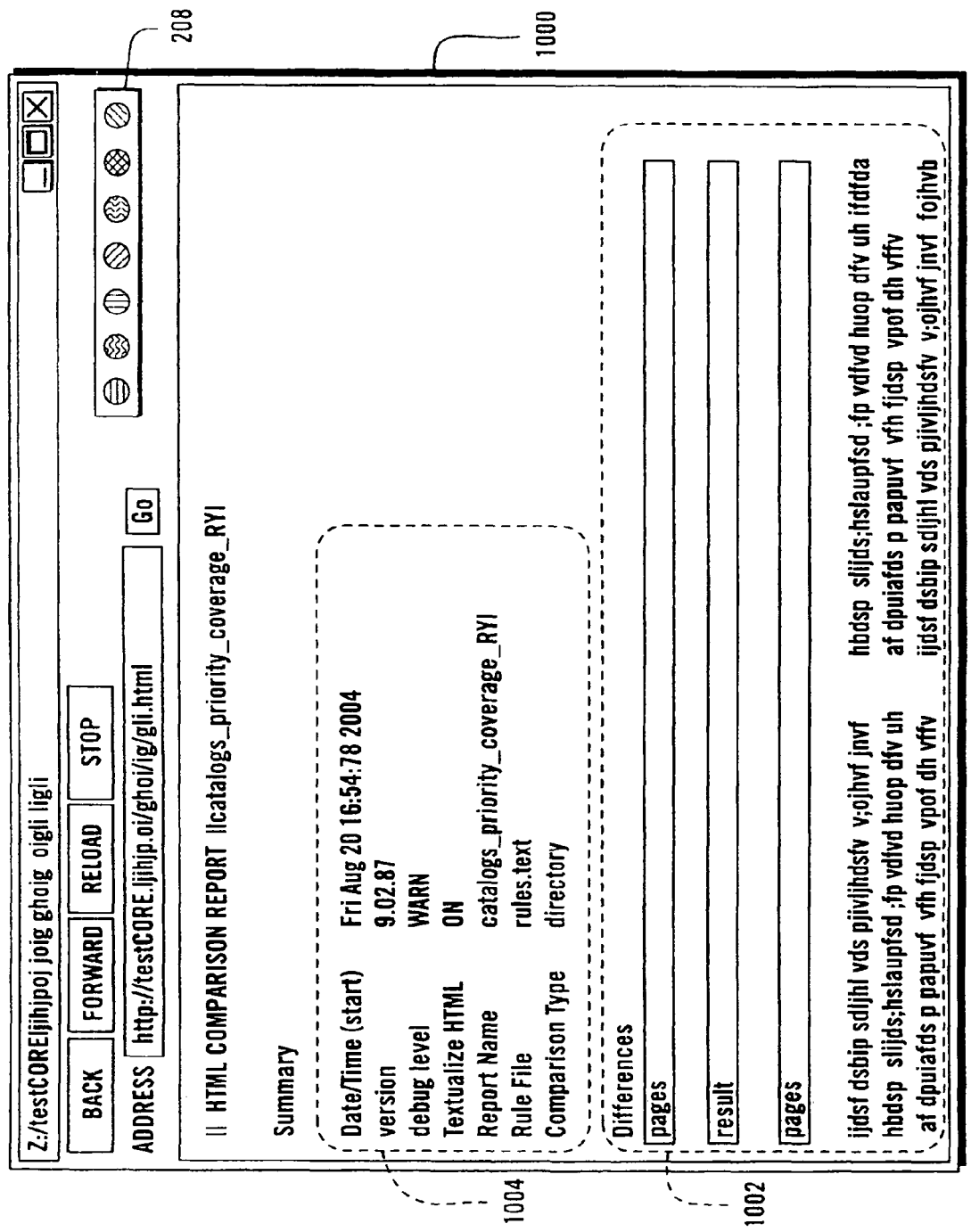
FIG. 10 is a user interface diagram illustrating an exemplary bug report generated by a testing device, according to one exemplary embodiment.

If the automated test case 212 is performed rather than the manual test case 200, the testing device 100 receives the automated test case 212 from the hosting server 110 into a test case buffer 214. The test case buffer 214 may queue one or more automated test cases 212 before utilizing a preview generator 210 within the testing device 100 to automatically perform the automated test case 212. In one embodiment, the preview generator 210 may also be located within the sniffer server 106. In one embodiment, the preview generator 210 may simultaneously preview a plurality of test cases by using a non-browser based tester module 316 within the sniffer server 106 as shown in FIG. 3. In one embodiment, the preview generator 210 may open a browser application 216 within the state machine 218 before performing the automated test case 212. Output generated from the automated test case 212 may include a bug report (e.g., HTML comparison report as shown in FIG. 10) or may indicate a differences view (e.g., differences between the expected representation and the generated representation for each web page within a test case as shown in FIG. 11). The output generator 206 may also operate to generate representations of encrypted and unencrypted web pages visited by a user when the automated test case 212 is performed, as previously described with respect to the manual test case 200.

Returning to FIG. 1, the sniffer server 106 includes a memory 108. Testing representations (e.g., HTTP XML 116A and HTTP XML 116B) are stored within the memory 108 for unencrypted web pages associated with a test case for a website. (e.g., the memory 108 may store testing representations of unencrypted web pages when a user initiates a test case for the website 111). In one embodiment, the memory 102 and the memory 108 may be cache memories within the testing device 100 and the sniffer server 106 respectfully. A zoom view of sniffer server 106 is illustrated in FIG. 3.

In FIG. 3, the sniffer server 106 includes a proxy generator 302, a memory 108, a non-browser based tester module 316, a test case buffer 314 and a state machine 318. The proxy generator 302 may automatically transform the sniffer server 106 into a proxy server between the hosting server 110 and the testing device 100 when the manual test case 200 is performed for a website 111 as previously described in FIG. 2. The proxy generator 302 within the sniffer server 106 may automatically transfer proxy settings to the testing device 100. The memory 108 may receive unencrypted representations (e.g., 116A and 116B) of the manual test case 200 as previously described. Furthermore, the memory 108 may transfer unencrypted representations to storage device 112 within the hosting server 110 if a stop recording button 502 (as shown in FIG. 5) is selected on the toolbar interface 208 within a testing module 202 as shown in FIG. 2.

The sniffer server 106 in FIG. 3 also includes a non-browser based tester module 316. The non-browser based tester module 316 may receive an automated test case 212 through a test case buffer 314. The test case buffer 314 may optionally queue one or more automated test cases 212 before utilizing the non-browser based tester module 316 within the sniffer server 106, (similar to the test case buffer 214 as described with reference to FIG. 2). The non-browser based tester module 316 may utilize memory 108 in performing simultaneous tests of a group of automated test cases in one embodiment. The non-browser based tester module 316 may operate faster than browser based testing (e.g., the browser application 216 within the testing device 100 as shown in FIG. 2) because it does not require the overhead code associated with a browser. The non-browser based tester module 316 may include a number of individual testing blocks (not shown) that allow the non-browser based tester module 316 to simultaneously perform automated test cases. The non-browser based tester module 316 may utilize the processing power of the state machine 318, but unlike the state machine 218 as described in FIG. 2, the state machine 318 in FIG. 3 includes no browser application 216. The state machine 318 may be a computer system 1200 as illustrated in FIG. 12. In one embodiment, the non-browser based tester module 316 within the sniffer server 106 may be used to simultaneously preview a plurality of test cases.

Returning to FIG. 1, the hosting server 110 includes storage device 112, a website 111, and a website 113. It should be noted that website 111 and website 113 may be portions of a website (e.g., a flow of web pages and associated application code) rather than an entire websites viewable you a user. The website 113 may be a newer version of website 111. The website 111 and the website 113 may each include a number of encrypted web pages and a number of unencrypted web pages in one embodiment. The website 111 may be a network based trading platform in one embodiment. Other embodiments, the website 111 may include any type of web based content, or web based application. The automated test case 212 for the website 111 as described in FIG. 2 (e.g., in the discussion of testing device 100) may automatically test a portion of programming code that is common between the website 111 and the website 113 in another embodiment. (e.g., an automated test case 212 from a previous website version may be reused to test the common test code in a newer version). In one embodiment, a storage device 112 within the hosting server 110 as illustrated in FIG. 1 (e.g., a hard drive, flash drive, or other type of non-Volatile or volatile storage device) may receive representations of encrypted websites (e.g., 114A and 114B) from the testing device 100, and may receive representations of unencrypted websites (e.g., 116A and 116B) from the sniffer server 106 when a test case is saved.

Figure 4:
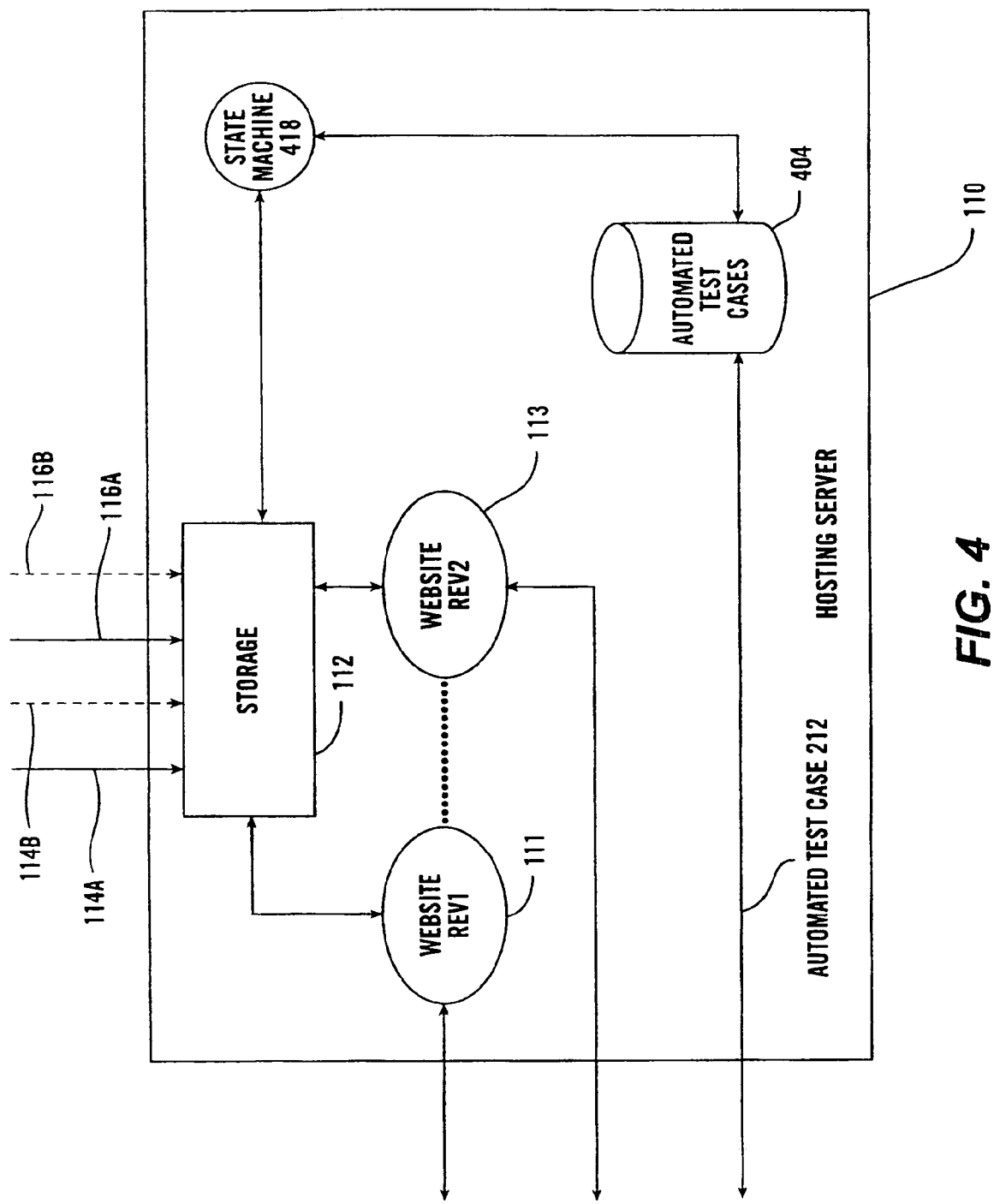
FIG. 4 is a block diagram illustrating a zoom view of the hosting server, according to one exemplary embodiment.

A zoom view of hosting server 110 is illustrated in FIG. 4. The hosting server may include a state machine 418 and an automated test case database 404. The state machine 418 may be a computer system 1200 as illustrated in FIG. 12. The automated test case database 404 may include detailed test results for a plurality of automated test cases that have been previously received and stored within storage device 112 within the hosting server 110 in one embodiment. The state machine 418 may operate to transform the representations received for encrypted web pages (114A and 114B) and representations received for unencrypted web pages (116A and 116B) into automated test cases that are stored within the automated test case database 404 in one embodiment. (e.g., the state machine 418 may process the representations received into the storage device 112 within the hosting server 110 into formats that can be interpreted by the test case buffer 214 and the state machine 218 within the testing device 100 as shown in FIG. 2 and the test case buffer 314 and the state machine 318 within the sniffer server 106 as shown in FIG. 3 to perform automated test case 212).

FIG. 5 illustrates a functional view of the toolbar interface 208 according to one exemplary embodiment. The toolbar interface 208 may be the toolbar interface 208 from which functions provided by the testing module 202 may be invoked as shown in FIG. 2. The toolbar interface 208 allows a user to invoke a number of operations that are illustrated as representative buttons in FIG. 5. In FIG. 5, toolbar interface 208 includes a Stop Recording button 502, an Add Verification button 504, an Add Editable Verification button 506, a View Verification button 508, an Add Shared Data button 510, an Info (Help) button 512, and a Preview button 514. The Stop Recording button 502 terminates the recording of a test case within a testing device 100. The Stop Recording button 502 may trigger the transmission of representations associated with encrypted and unencrypted web pages from the testing device 100 and the sniffer server 106 to the hosting server 110 as previously described in FIGS. 1 and 2.

The Add Verification button 504 allows a user of a testing device 100 to manually highlight a portion of a web page and indicate the portion that has been highlighted as including required text information for future test cases (e.g., as shown in window 604 in FIG. 6). As such, Add Verification 504 may allow a user to hard code in additional candidates for testing by particularly pointing out areas of a web-page that the user wishes to insure are maintained precisely as the expected HTML result. The Add Editable Verification button 506 may be similar to the Add Verification button 504 but provides the user a prompt screen from which to indicate whether and what data should be included in an automated test case irregardless of the actual data currently viewed within the web-page (e.g., as shown in window 606 in FIG. 6). As such, the Add Editable Verification button 506 may allow a user to customize a particular test case so as to allow additional search criteria not represented within the viewable web pages within the test case.

The View Verification button 508 may allow a user to preview what has been manually inputted through the Add Verification and Add Editable Verification buttons 504 and 506 into a particular test case (e.g., as shown in window 608 in FIG. 6). In one embodiment, the Add Verification button 504, the Add Editable Verification button 506 and the View Verification button 508 each invoke functions of the Verification Module 204 as illustrated in FIG. 2 within the testing device 100. The Add Shared Data button 510 may allow a user to define a filter area (e.g., by highlighting a portion of a web page) and instruct a particular test case (e.g., a particular test case may include a representation of actions that a typical user would take to bid on an item on a commerce website for example) to ignore certain data fields or content within certain data fields within the filter area of a web page (e.g., as shown in window 610 in FIG. 6). For example, the Add Shared Data button 510 may indicate that a particular screen area of a web-page contains dynamic content that can change and should be ignored by the test case in future iterations because the dynamic content does not indicate an error in programming code, but rather implements a feature of the particular website being tested (e.g., a feature such as showing a user's name, current temperature, date and time, etc.).

The Info (Help) button 512 allows a user to get help about how to operate the toolbar interface 208 within a browser. The Preview button 514 may allow a user to view contents of a particular test case and replay the test case without manual entry. In one embodiment, the Preview button 514 may trigger a Non-Browser Based Tester Module 316 within the sniffer server to simultaneously test a plurality of test cases. In another embodiment, the Preview button may trigger the preview generator 210 within the testing device 100 to automatically rerun the automated test case 212 as shown in FIG. 2.

FIG. 6 illustrates an activated toolbar interface 208. Furthermore, in FIG. 6 the effect of selecting Add Verification 504 on toolbar interface 208 as described in FIG. 5 is illustrated within the window 604. In addition, the effect of selecting Add Editable Verification button 506 in FIG. 5 is illustrated within the window 606 in FIG. 6. The View Verification button 508 in FIG. 5 is illustrated as an open window 608 in FIG. 6. The Add Shared Data button 510 is illustrated as a window 610 in FIG. 6. Each one of the windows 604-610 maybe opened when a user points and selects a button within the toolbar interface 208. The window 604 displays text that has been highlighted by a user on the web page 600 and may be required information that must be shown within a particular test case. The window 604 contains an accept verify keyword button that allows the user to accept what is displayed in window 604 as mandatory content within any web-page in which the particular test case is performed. The window 606 allows a user to manually enter in data that should be either positively within a particular web page or must not be there or else an error will be displayed. The window 608 displays a summary of keywords to be added prior to acceptance by a user. The window 610 allows a user to enter shared data that may be ignored because it is dynamic and constantly changing as previously described with respect to button 510 in FIG. 5.

Figure 7:
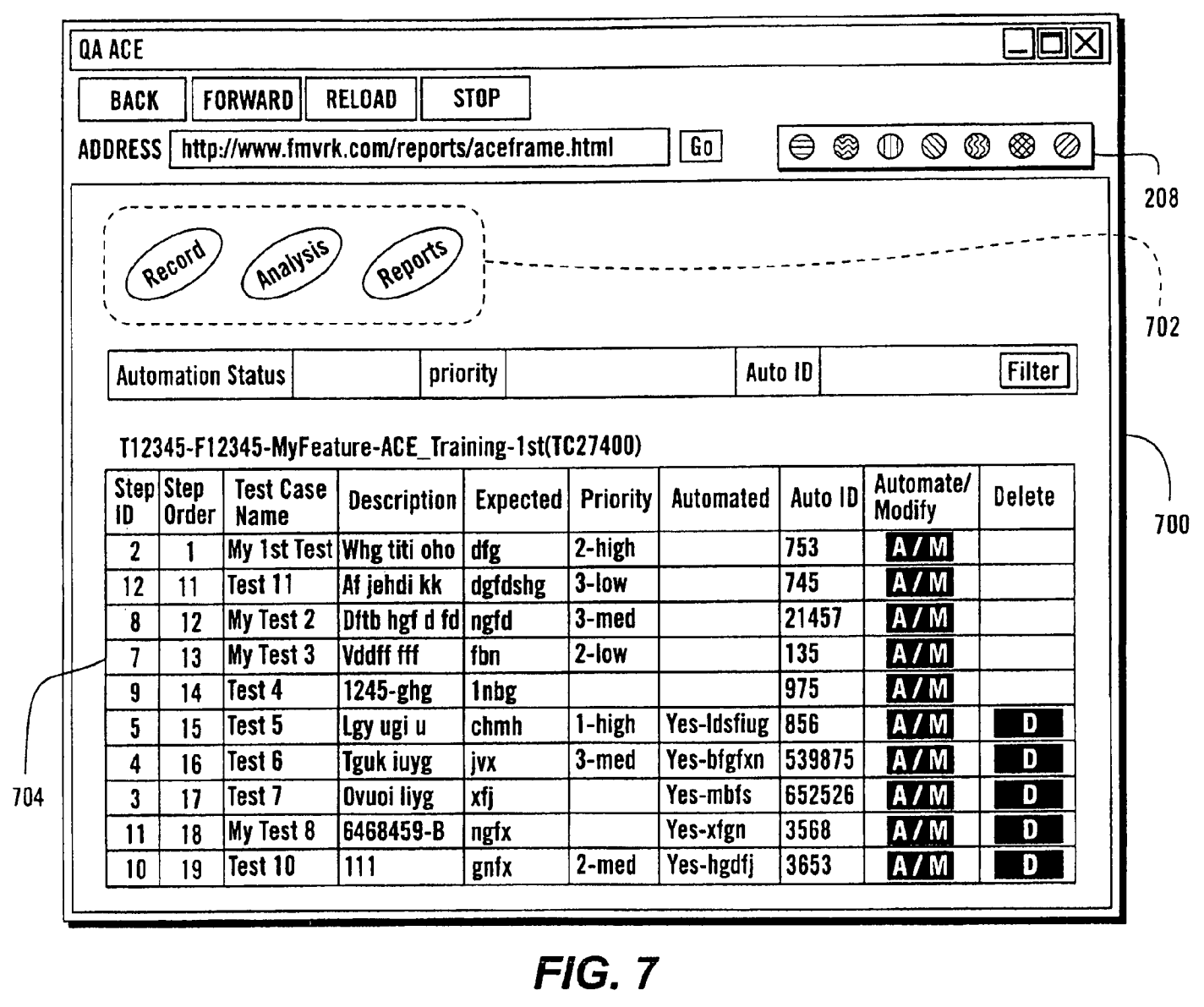

FIG. 7 illustrates an exemplary user interface 700 for initiating a test case within the testing device 100 according to one exemplary embodiment. In FIG. 7, a window 704 indicates a plurality of test cases and a priority associated with each test case that can be run within a testing device 100. A series of selection choices 702 allows a user to indicate when a test case may be performed. Also shown in FIG. 7 is the toolbar interface 208 as previously described in FIG. 5.

Figure 8:
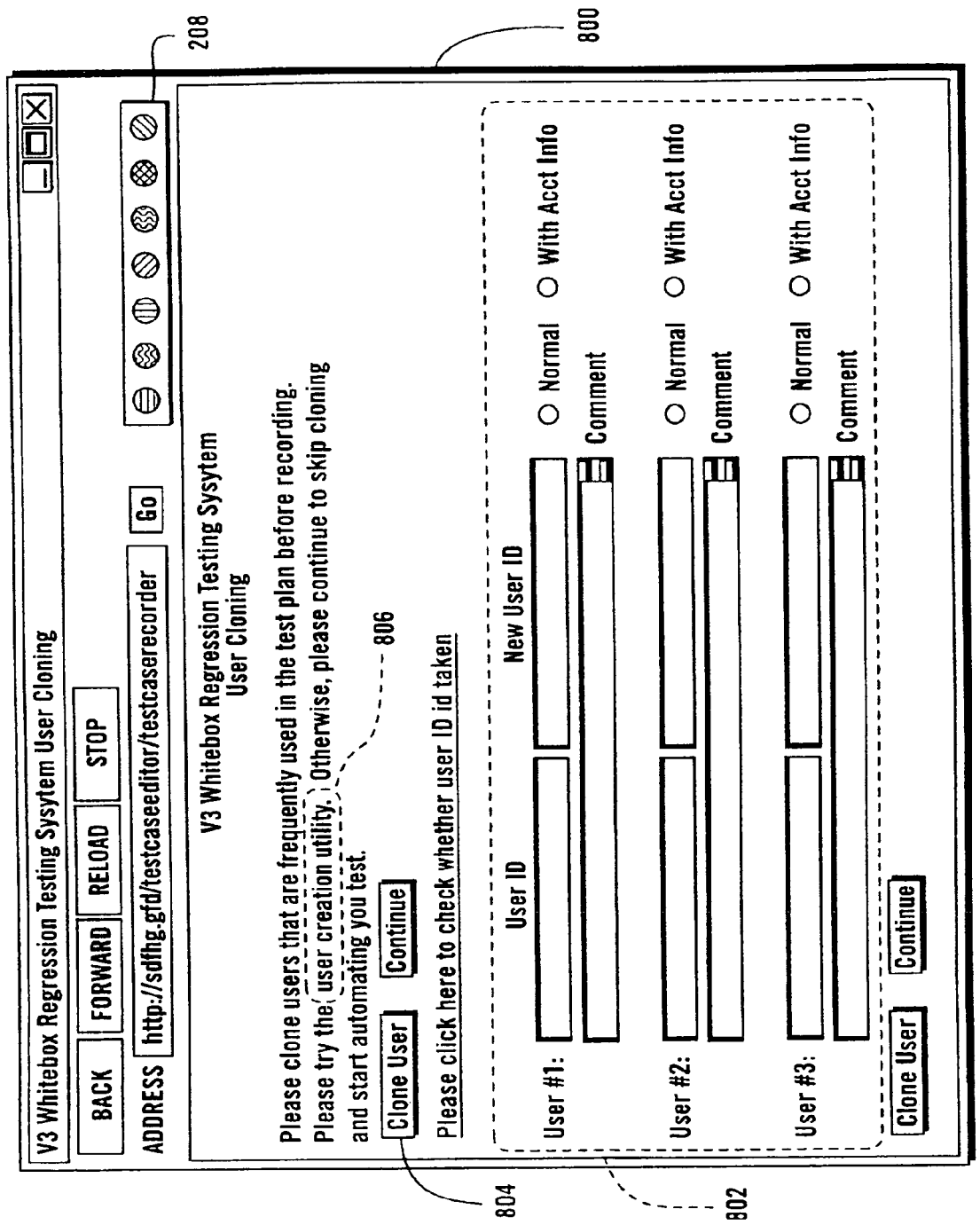
FIG. 8 is a user interface diagram illustrating an exemplary user interface (UI) for reusing user profile information, according to one exemplary embodiment.

FIG. 8 illustrates an exemplary user interface 800 for re-using user profile. In FIG. 8, user profile information 802 can be manually selected or entered as well as dynamically re-used (e.g., by selecting a scrolled choice within the user profile information 802 or by selecting a clone user button 804) so that a user does not have to re-enter or recreate a user profile for every single test case. As such, the exemplary user interface 800 shown in FIG. 8 may allow a user to save time when manually creating a new test case. The clone user button 804 may allow a user to quickly duplicate a particular test case profile (e.g., a test case profile may include details such as name, address, and access privileges of a particular type of user, such as a buyer or seller on a commerce website) that has been previously created for a particular user. A user creation utility 806 may allow a user to create a new user profile by manually entering information. Also shown in FIG. 8 is the toolbar interface 208 as previously described in FIG. 5.

Figure 9:
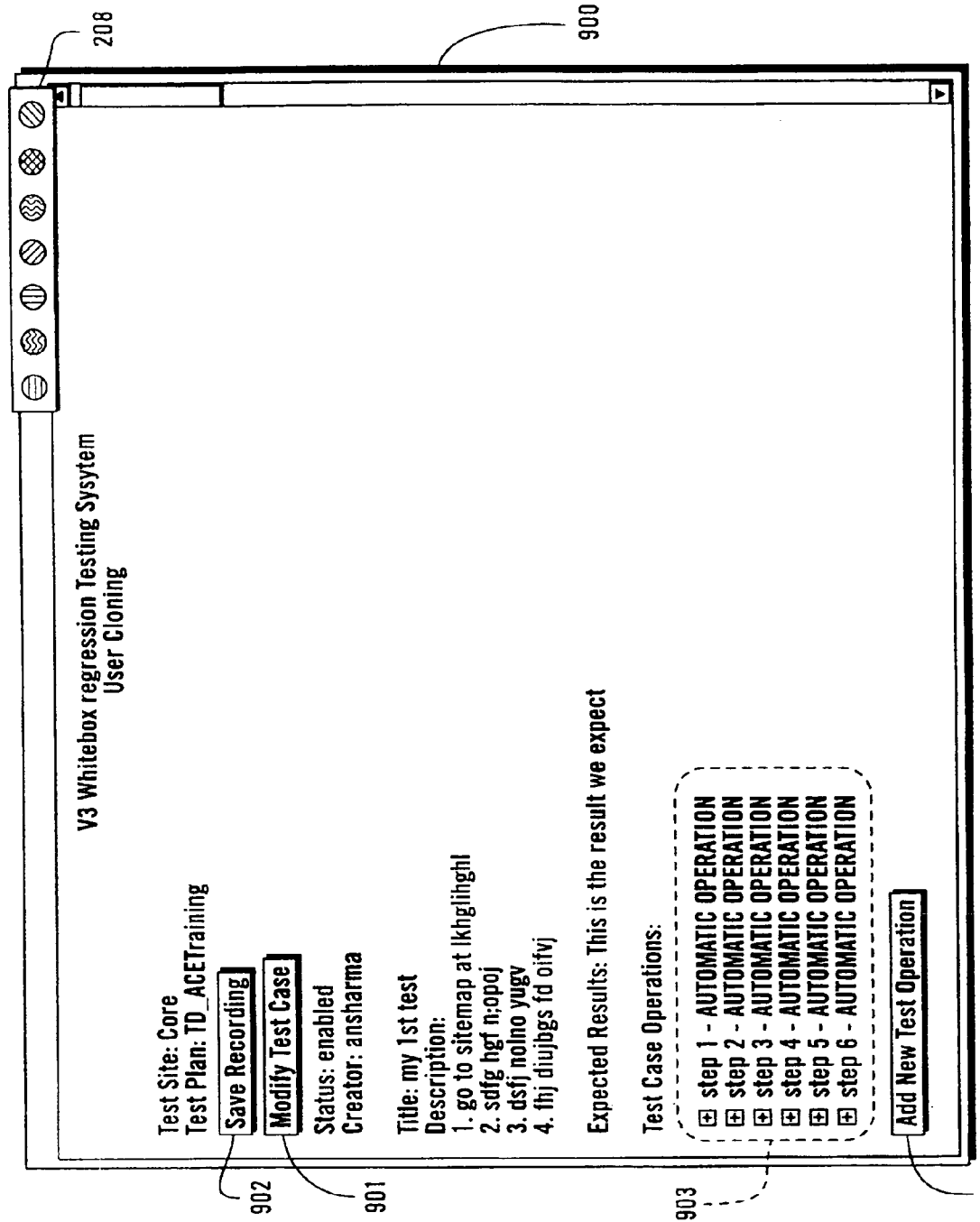
FIG. 9 is a user interface diagram illustrating an exemplary user interface (UI) for editing a test case, according to one exemplary embodiment.

FIG. 9 illustrates an exemplary user interface 900 for editing a test case . . . . In FIG. 9 a modify test case option is shown as 901, which allows a user to modify operations within a test case that has been recorded as shown in 903. The test case operations shown in 903 may be performed within an automated test case 212 (as shown in FIG. 4) and may be executed by a state machine 418 within a hosting server 110 according to one embodiment. The exemplary user interface in FIG. 9 also illustrates a Save Recording button 902 once a user is satisfied with the current test case (e.g., activating the Save Recording button 902 may signal a transfer of the representations 114A-B, and 116A-B to the storage device 112 within the hosting server 110 in one embodiment). Also, an Add New Test Operation is shown in 905, which allows a user to dynamically add additional operations to a particular test case.

FIG. 10 illustrates a bug report generated by a testing device 100 (as shown in FIG. 1), according to one exemplary embodiment. In FIG. 10, a summary of the bug report 1000 is shown at the top as 1004. The differences between the expected result and the generated result are shown in detail in a detailed difference view 1002. In one embodiment, when a user selects (e.g., by using a mouse) one of the differences within the detailed difference view 1002, a difference view 1100 may be generated as shown in FIG. 11 that graphically displays the particular error selected within the detailed difference view 1002 as shown in FIG. 10.

FIG. 11 illustrates a difference view 1100 generated by a testing device 100 (as shown in FIG. 1), according to one exemplary embodiment. In FIG. 11 the difference view 1100 includes a delta view 1101 showing the differences between the expected view and the view that has been generated by the current test case. The delta view 1101 illustrates the delta, or difference, between the expected result and the current result for a particular test case using strike-through and underline to clearly show the differences between the expected result and the current result.

FIG. 12 shows a diagrammatic representation of machine in the exemplary form of a computer system 1200 within which a set of instructions, for causing the machine to perform any one or more of the methodologies discussed herein, may be executed. In various embodiments, the machine operates as a standalone device or a connected (e.g., networked) device, coupled to other machines. In a networked deployment, the machine may operate in the capacity of a server or a client machine in a server-client network environment, or as a peer machine in a peer-to-peer (or distributed) network environment. The machine may be a server computer, a client computer, a personal computer (PC), a tablet PC, a set-top box (STB), a Personal Digital Assistant (PDA), a cellular (or mobile) telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 1200 includes a processor 1202 (e.g., a central processing unit (CPU), a graphics processing unit (GPU) or both), a main memory 1204 and a static memory 1206, which communicates with each other via a bus 1208. The computer system 1200 may further include a video display unit 1210 (e.g., a liquid crystal display (LCD) or a cathode ray tube (CRT)). The computer system 1200 also includes an alphanumeric input device 1212 (e.g., a keyboard), a cursor control device 1214 (e.g., a mouse), a disk drive unit 1216, a signal generation device 1218 (e.g., a speaker) and a network interface device 1220.

The disk drive unit 1216 includes a machine-readable medium 1222 on which is stored one or more sets of instructions (e.g., software 1224) embodying any one or more of the methodologies or functions described herein. The software 1224 may also reside, completely or at least partially, within the main memory 1204 and/or within the processor 1202 during execution thereof by the computer system 1200, the main memory 1204 and the processor 1202 also constituting machine-readable media. The software 1224 may further be transmitted or received over a network 104 via the network interface device 1220. In one embodiment, the computer system 1200 may be the state machine 218 in FIG. 2. In another embodiment, the computer system 1200 may be the state machine 318 in FIG. 3 or the state machine 418 in FIG. 4.

While the machine-readable medium 1222 in FIG. 12 is shown in an exemplary embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that causes the machine to perform any one or more of the methodologies of the present invention. The term "machine-readable medium" shall accordingly be taken to include, but not be limited to, solid-state memories, optical and magnetic media, and carrier wave signals.

Figure 13:
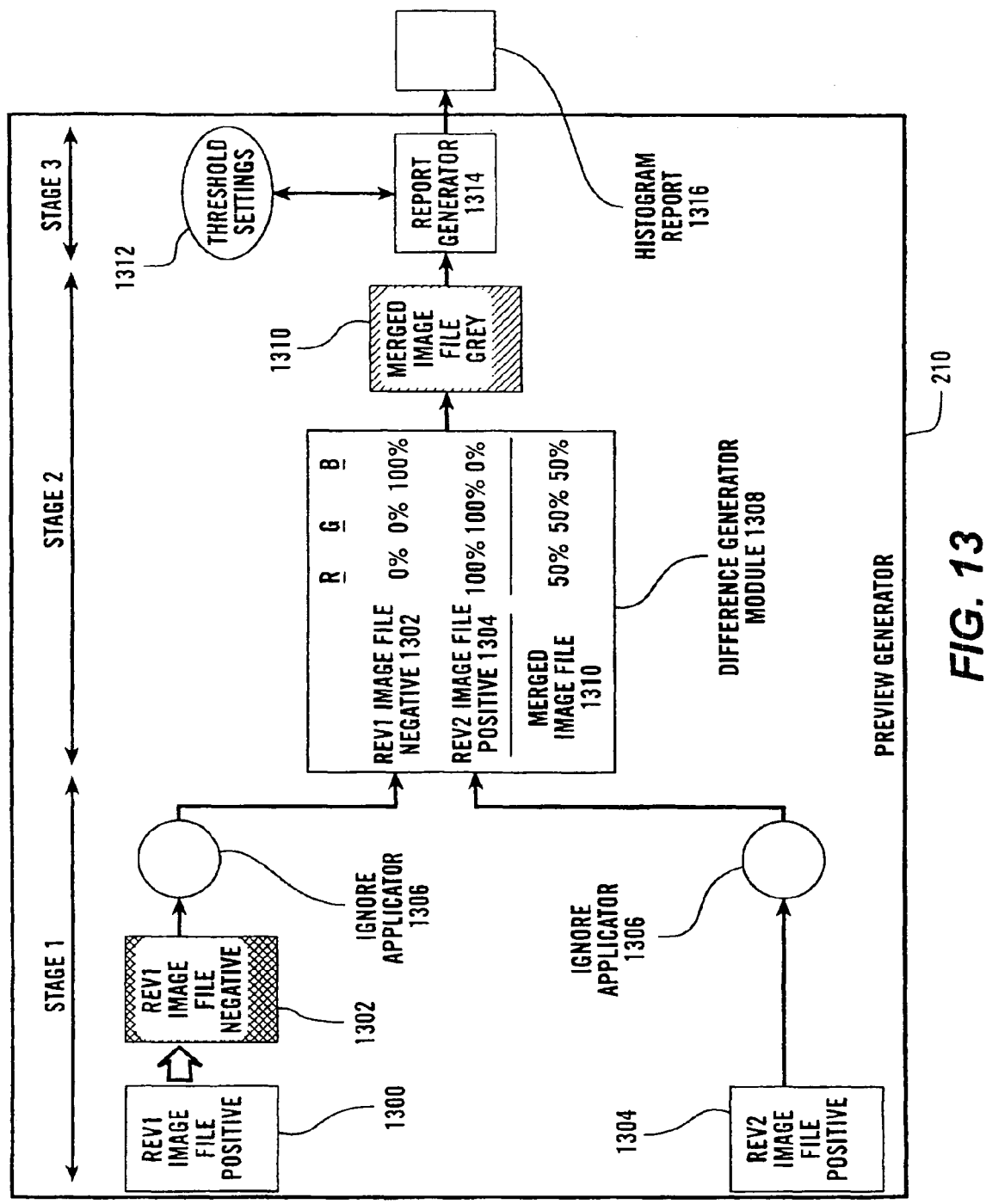
FIG. 13 is a block diagram illustrating a preview generator within a testing device for creating a merged image file, according to one exemplary embodiment.

FIG. 13 illustrates a preview generator 210 within the testing device 100 for creating a merged image file 1310, according to one exemplary embodiment. In one embodiment, the merged image file 1310 may be a JPEG file created when an image file 1302 and an image file 1304 are overlaid. As such, FIG. 13 illustrates a zoom view of the preview generator 210 as shown in FIG. 2. Three stages are illustrated within FIG. 13. The first stage corresponds with the conversion of source code files to image files, and the inversion of one image file. The second stage corresponds with the application of a difference generator module 1308 to each pixel within the image files to create a merged image file 1310. The third stage corresponds to the analysis of the merged image file 1310 by applying a threshold settings module 1312 and creating reports through a report generator module 1314 (e.g., a histogram report 1316). It should be noted that the preview generator 210 might perform other applications consistent with this disclosure, including automatic and/or simultaneous browser and non-browser based execution of XML code to rerun a test case.

In FIG. 13, according to one embodiment, an image file 1300 may be a JPEG version of a web page that has been viewed during the manual test case 200 performed on the previous version website 111 (e.g., as shown in FIG. 2). The image file 1304 may be a JPEG version of a web page that has been viewed during the manual test case 201 performed on the current version website 113 in another embodiment. In one embodiment, both the image file 1300 and the image file 1304 correspond to a same progression within a test case performed on the previous version website 111 and the current version website 113 respectively.

The image file 1300 and the image file 1304 may be converted from source code into image file representations (e.g., JPEG, PICT, etc.) of each web page associated with a particular source code. In one embodiment, a user may select a button on a toolbar interface 208 within a testing module 202 as shown in FIG. 2, to perform a conversion of source code into image file representations. In another embodiment, a state machine 218 as shown in FIG. 2 may be used to perform the conversion into image file representations. As such, the image file 1300 and the image file 1304 may be JPEG graphical views of individual web pages viewed during testing of a website. In one embodiment, the image file 1300 and the image file 1304 correspond to the same exact web page within a website across two revisions of the website (e.g., the image file 1300 and the image file 1304 may be the exact same view of a web page but generated by two different revisions of the same website 111 as shown in FIG. 2).

The image file 1300 and the image file 1304 are both shown having a positive color bias, meaning that each of the web pages 1300 and 1304 are images files that have the actual color scheme intended by a website designer (e.g., the color scheme indicated within unaltered source code of a particular web page). The image file 1300 is inverted (e.g., transformed) from a positive color bias (e.g., image file 1300) into a negative color bias (e.g., image file 1302) by converting each pixel within the image file associated with image file 1300 into the opposite color within a color spectrum (e.g., a RGB color spectrum). As such, a negative image file 1302 is generated from the positive image file 1300 for each web page associated with a test case for the previous version website 111. In one embodiment, a state machine 218 within the testing device 100 performs this transformation from a positive bias to a negative bias for each web page associated with a manual test case 200 and/or a manual test case 201 and/or an automated test case 212 as shown in FIG. 2. In one embodiment, each pixel within the image file 1302 is the opposite color from a corresponding pixel within the image file 1300, when a RGB color spectrum is used. For example, a yellow pixel within the image file 1300 that consists of red and green within the RGB spectrum both at 100% and blue at 0%, may be transformed to a blue pixel within the inverted image file 1302 having 0% for red and green and 100% for blue (e.g., a standard RGB conversion scheme).

The image file 1304 may be associated with a test case for the website 113, and may not be inverted into a negative color bias. Rather, the image file 1304 may be maintained at a positive color bias. In another embodiment, the image file 1304 may be inverted rather than the image file 1300. In one embodiment, the negative image file 1302 and the positive image file 1304 may have the same content but for two different revisions (website revisions 111 and 113 as shown in FIG. 1) of the same website (e.g., such as a commerce platform). As such, the content that may be viewable to a user within the image file 1300 may be the same as the content within the image file 1304.

Next, the image file 1302 and the image file 1304 are transferred to an ignore applicator 1306 to reduce the number of false positives (e.g., areas of the web pages that may contain acceptable dynamic content rather than contain unacceptable visual artifacts within the visual representation of the web pages). In one embodiment, the ignore applicator 1306 creates a filter area (e.g., an area on the web pages to be ignored by the difference generator module 1308, or alternatively, an area to be solely considered by the difference generator module 1308) on both the image file 1302 (e.g., an inverted image file) and the image file 1304 (e.g., a non-inverted image file) to prevent comparison of content within the filter area. The ignore applicator 1306 may permit the user to select and/or highlight a portion of either the image file 1302 and/or the image file 1304 that should be ignored by the difference generator module 1308 (e.g., a user may draw a box around the region of a particular image file 1302 and/or 1304 that should be ignored). In one embodiment, a user draws a pure gray (red, blue, and green all at 50% within a RGB spectrum) box around the area to be ignored using a pointer tool (e.g., a mouse). In another embodiment, a user creates a positive color bias and a corresponding negative color bias covering the portion of a web page to be ignored within the image file 1302 and the image file 1304. In one embodiment, the image files 1302 and 1304 have diametrically opposite RGB colors for every single pixel constituting each one of the two image files 1302 and 1304 and the difference generator module 1308 ignores the pixels within the portion of the image files selected using the ignore applicator 1306. In one embodiment, the ignore applicator 1306 will apply a filter that will mask a portion of the image file 1302 and the corresponding portion of the image file 1304 with a pure gray color having 50% RGB. In another embodiment, a user may highlight a portion of either the image file 1302 and/or the image file 1304 using a selector tool to cover an area that they wish to be not compared by the difference generator module 1308. In another embodiment, the colors within each of the image file 1302 and the image file 1304 are preset to pure gray within the portion of the web pages to be ignored. In another embodiment, the ignore applicator 1306 may not be required, and all areas of the image file 1302 and the image file 1304 are compared by the difference generator module 1308.

Next, differences between two website revisions of a page (e.g., the first website version 111 having the image file 1300 that has been inverted into the image file 1302, and the second website version 113 having the image file 1304) are examined by the difference generator module 1308. It should be noted that in one embodiment, the difference generator module 1308 compares only the image file (JPEG, PICT, etc.) versions of the web pages associated with a test case. In another embodiment, the difference generator module 1308 overlays the inverted image file 1302 of a first web page associated with the previous version website 111, and the non-inverted image file 1304 of a second web page associated with the current version website 113 as shown in FIG. 2. In one embodiment, there are a series of image files (e.g., a series of the image file 1302 and a series of the image file 1304), each of which are associated with a corresponding view on a previous version website and corresponding view on a current version website, that are examined by the difference generator module 1308. In one embodiment, only image files of web pages that should match exactly between the previous version website 111 and the current version website 113 as shown in FIG. 2 are provided to the difference generator module 1308 within preview generator 210 as illustrated in FIG. 13. In one embodiment, the difference generator module 1308 averages the RGB colors within each pixel that makes up the image file 1302 with each corresponding pixel that makes up the image file 1304 to form a new corresponding pixel within the merged image file 1310.

For example, illustrated inside the difference generator module 1308 of FIG. 13, a particular pixel within the image file 1302 includes 0% for red and green, and 100% for blue. A corresponding pixel to the particular pixel within the image file 1304 includes 100% for red and green, and 0% for blue. The difference generator module 1308 averages each of the colors within the particular pixel and the corresponding pixel to form the merged pixel having 50% for red, green, and blue. For example, the 0% for red within a pixel associated with image file 1302 is averaged with the 100% for red within a pixel associated with the image file 1304 to form the 50% merged pixel associated with the merged image file 1310. Furthermore, the 0% for green within the pixel associated with the image file 1302 is averaged with the 100% for green within the pixel associated with the image file 1304 to form the 50% merged pixel associated with the merged image file 1310. Similarly, the 100% for blue within the pixel associated with the image file 1302 is averaged with the 0% for blue within the pixel associated with the image file 1304 to form the 50% merged pixel associated with the merged image file 1310.

The difference generator module 1308 performs a check of every single pixel within the particular image file 1302 to the corresponding pixel within the image file 1304 and generates an average value that may be used within a corresponding pixel within the merged image file 1310. As such, if the image file 1302 and the image file 1304 are exactly the same, the merged image file 1310 should have a pure gray color (50% average RGB) for every single pixel because the image file 1302 is a negative bias of the image file 1300 that corresponds the older version website 111, and the image file 1304 is a positive bias web page that corresponds with the newer version website 113 (e.g., the image file 1302 is an inverted image file as described above).

It should be noted that in one embodiment, a partial inversion may be performed on both the image file 1300 and 1304, and an alternate color may be selected rather than pure gray to aid visual inspection of differences. In another embodiment, rather than inversion of one web page, the difference generator module 1308 directly compares each pixel within the image file 1300 and the image file 1304 to determine whether or not there is an exact match. In one embodiment, the ignore applicator 1306 may modify the image file 1302 and/or the image file 1304 so as to cover up a portion of the image files so that they are not considered by the difference generator module 1308. In another embodiment, the comparator module 222 and the filter module 228 may be used as described with reference to FIG. 2, but for image files rather than source code, so as to create an image filter report similar to the source code based filter report 224 as described previously (e.g., a filter report may be prepared for each and every image file so as to ignore differences between two corresponding web pages within a particular website having two revisions).

If there are differences between the image file 1300 and the image file 1304, the merged image file 1310 will include pixels that are not pure gray in color but rather are a different shade. (e.g., because the negative image file 1302 might not be an exact inversion of the same content as found within the image file 1304). As such, the merged image file 1310 may include pixels that are not in pure gray. These pixels can be visually inspected by a user and highlighted as potential candidates for error.

Next, the threshold settings module 1312 may be used to generate a histogram report 1316 that details how many pixels are pure gray, and how many pixels are other colors. In one embodiment, a user indicates permissible variances (e.g., 99.6% pure gray within a web page may be acceptable) using the threshold settings module 1312. The threshold settings module 1312 may allow a user to select a percentage of pixels that must have a pure gray color for a test to be successful. In another embodiment, the report generator 1314 determines whether or not the web page is acceptable by using the permissible variances as a guideline threshold for passing. In one embodiment, all the processes within the preview generator 210 as described within stage 1, stage 2, and stage 3 are rapidly and automatically performed within a state machine 218 that has been optimized for creating merged image files.

The report generator 1314 may then prepare the histogram report 1316 that indicates what percentage of pixels within the merged image file 1310 are pure gray. In one embodiment, a user may then inspect the histogram report and zoom in on differences between individual pixels reported as different within the histogram report 1316 to determine whether or not there are false positives similar to as described with respect FIG. 10 and FIG. 11. In another embodiment, the histogram report 1316 includes color distribution for each pixel within a plurality of the merged image file 1310, wherein each merged image file 1310 is associated with an individual web page viewed when performing a test case on the current version website 113.

Figure 14:
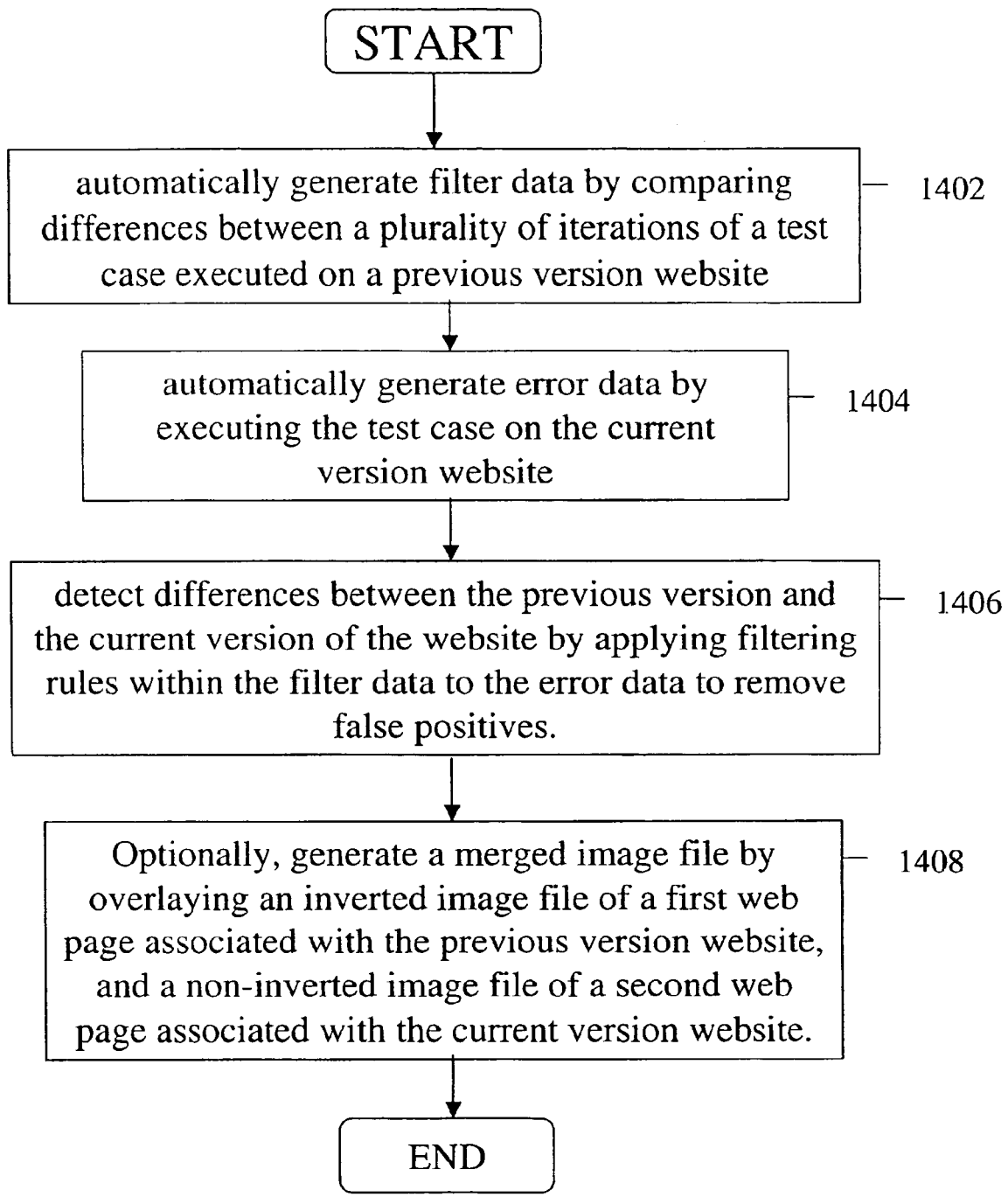
FIG. 14 is a flow chart illustrating a process flow within a testing system for testing web pages associated with a current version website, according to one exemplary embodiment.

FIG. 14 illustrates a process flow within a testing system for testing web pages associated with a current version website, according to one exemplary embodiment. In operation 1402, the filter data (e.g., filter report 224) may be automatically generated by comparing differences between a plurality of iterations of a test case executed on a previous version website 111. In one embodiment, the number of iterations of the manual test case 200 associated with the previous version website 111 are performed within a number of testing blocks within the testing module 202 as shown in FIG. 2. In operation 1404, the error data (e.g., error report 226) may be automatically generated by executing the test case on the current version website 113. In operation 1406, differences between the previous version and the current version of the website may be detected by applying filtering rules (e.g., rules that indicate what parts of source code are false positives) within the filter data (e.g., filter report 224) to the error data (e.g., error report 226) to remove false positives 226 (e.g., the false positives may be errors which are not actual errors within the programming code but merely indicators of dynamic data that has been pre-designed into the source code). In one embodiment, as shown in FIG. 2, the manual test case 201 may be performed on the portions of programming code associated with the current version website 113 that are new, and the automated test case 212 may be performed on the common portions of programming code within the website 113 and a previous version website (e.g., such as the website 111). In operation 1408, the merged image file 1310 is optionally generated by overlaying the inverted image file 1302 of a first web page associated with the previous version website 111, and the non-inverted image file 1304 of a second web page associated with the current version website 113, as shown in FIG. 13. In one embodiment, the difference generator module 1308 as described with reference to FIG. 13 generates the merged image file 1310.

Figure 15:
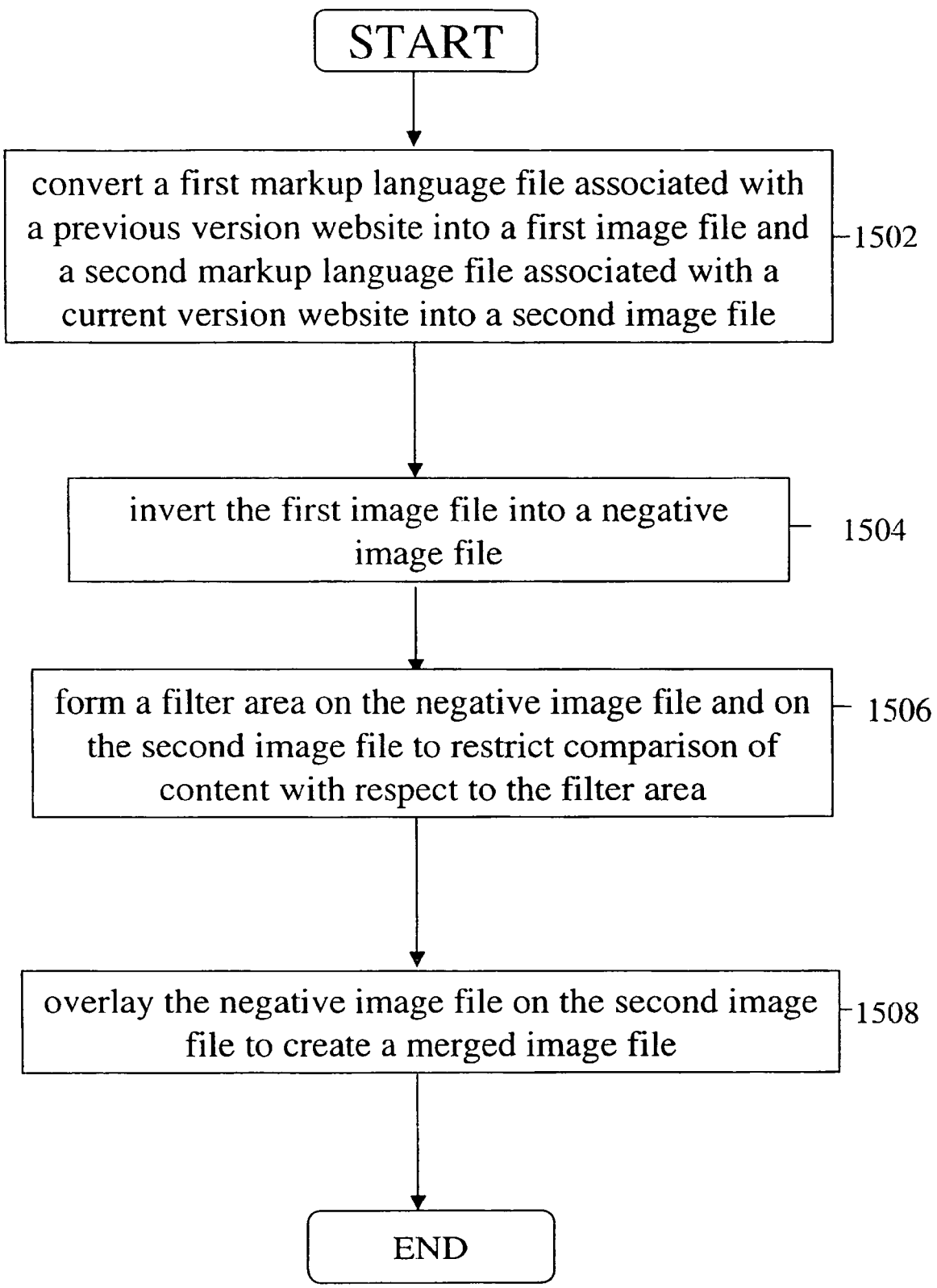
FIG. 15 is a flow chart illustrating a process flow within a preview generator inside a testing device for creating a merged image file, according to one exemplary embodiment.

FIG. 15 illustrates a process flow within a preview generator inside a testing device for creating the merged image file 1310, according to one exemplary embodiment. In operation 1502, a first markup language file (e.g., HTML source code) associated with the previous version website 111 may be converted into the first image file 1300 and a second first markup language file associated with the current version website 113 may be converted into the second image file 1304. In operation 1504, the first image file 1300 may be inverted into the negative image file 1302. In one embodiment, a RGB inversion may be performed as previously described with reference to FIG. 13. In operation 1506, a filter area may be formed on the negative image file 1302 and on the second image file 1304 to restrict comparison of content with respect to the filter area (e.g., either to exclude the content within the filter area, or to solely include content within the filter area, etc.). In one embodiment, the ignore applicator 1306 as described in FIG. 13 may be used to form the filter area. In operation 1508, the negative image file 1302 may be overlaid on the second image file 1304 to create the merged image file 1310. In one embodiment, the difference generator module 1308 may be used to create the merged image file 1310. In another embodiment, the image file 1300, the negative image file 1302, and the image file 1304 are associated with web pages viewed during a test case. In another embodiment, the web pages associated with the images files correspond to a same progression within a test case executed by the testing device 100 on the website version 111 and the website version 113 (e.g., different revisions of the same website).

Thus, a method and system to reduce false positives within an automated software-testing environment using a comparator module, a filter application module, and a preview generator module have been described. Although the present invention has been described with reference to specific exemplary embodiments, it will be evident that various modifications and changes may be made to these embodiments without departing from the broader spirit and scope of the invention. Accordingly, the specification and drawings are to be regarded in an illustrative rather than a restrictive sense.

What is claimed is:

1. A method for testing a current version website within a testing system, including:
   removing false positives to detect differences between a previous version website and the current version website by applying filtering rules within a filter data generated by comparing differences between a plurality of iterations of a test case executed on the previous version website, to an error data generated by executing the test case on the current version website; and
   creating a merged image file by overlaying an inverted image file of a first web page associated with the previous version website, with a non-inverted image file of a second web page associated with the current version website.

2. The method of claim 1, wherein the first web page and the second web page both correspond to a same progression within a test case performed on the previous version website and the current version website respectively.

3. The method of claim 2, wherein only the second web page is tested rather than the entire current version website.

4. The method of claim 1, further including forming a filter area on both the inverted image file and the non-inverted image file, the filter area to limit a comparison of the inverted and the non-inverted image files.

5. The method of claim 1, wherein the merged image file is one of a plurality of merged image files, the method further including creating a histogram report of color distribution for the plurality merged image files, wherein each merged image file of the plurality of merged image files is associated with an individual web page viewed when performing the test case on the current version website.

6. The method of claim 1, further including activating a toolbar interface on a browser application within the testing system to test functionality of the current version website.

7. The method of claim 6, further including recording operations of a user of the previous version website at the testing system to generate the test case to have an expected HTML representation of web pages visited by the user and a XML representation of the operations of the user, for a set of encrypted and unencrypted web pages.

8. The method of claim 7, further including storing the expected HTML and the XML representation of the encrypted web pages within a first volatile memory at the testing system, and storing the expected HTML and the XML representations of the unencrypted web pages within a second volatile memory at a sniffer server acting as a proxy server, located between the testing system and a hosting server.

9. The method of claim 8, further including transferring the stored encrypted and unencrypted web pages to a storage device within the hosting server when the test case is terminated.

10. The method of claim 8, further including simultaneously previewing a plurality of test cases by using a non-browser based testing module within the sniffer server.

11. A system to test programming code associated with a website and to reduce false positives within a first test case, the system including:
    a testing device having filter module to remove false positives identified within a filter data from an error data and to store within a first memory a first HTML representation and a first XML representation of encrypted web pages viewed during a first test case;
    a sniffer server to operate as a proxy server for the website and to store within a second memory a second HTML representation and a second XML representation of unencrypted web pages viewed during the first test case; and
    a hosting server to host the website and to receive the first and the second HTML and XML representations from the testing device and the sniffer server when the first test case is terminated.

12. The method of claim 11, wherein the filter data is created by comparing differences between a plurality of iterations of the first test case executed on a previous version website, and the error data is created by executing the first test case on a current version website.

13. The system of claim 11, further including a difference generator module to create a merged image file by overlaying an inverted image file of a first web page associated with a previous version website, and a non-inverted image file of a second web page associated with a current version website.

14. The system of claim 11, wherein the difference generator module to form a filter area on both the inverted image file and the non-inverted image file to prevent comparison of content within the filter area.

15. The system of claim 13, wherein the merged image file is one of a plurality of merged image files, the system further including a report generator to create a histogram report of color distribution for the plurality of the merged image files, wherein each merged image file of the plurality of merged image files is associated with an individual web page viewed when performing the first test case on the current version website.

16. The system of claim 11, wherein the hosting server to store the received HTML and XML representations within a non-volatile storage device within the hosting server.

17. The system of claim 11, wherein the sniffer server to simultaneously preview a plurality of test cases by using a non-browser based testing module within the sniffer server.

18. The system of claim 11, wherein the testing system to verify at least one keyword and at least one variable database value, both of which are selected by a user.

19. The system of claim 11, wherein the testing system to create a second test case by editing the first and the second XML representations and to insert a range of values for various iterations of the second test case.

20. The system of claim 19, wherein the second test case uses at least a portion of data from the first test case without manual entry by the user.

21. The system of claim 11, wherein the testing system automatically to test programming code within a new version of the website that is common with programming code within at least one previous version of the website.

* * * * *

UNITED STATES PATENT AND TRADEMARK OFFICE
CERTIFICATE OF CORRECTION

| | | |
|---|---|---|
| PATENT NO. | : 8,015,239 B2 | Page 1 of 1 |
| APPLICATION NO. | : 10/969738 | |
| DATED | : September 6, 2011 | |
| INVENTOR(S) | : Sharma et al. | |

It is certified that error appears in the above-identified patent and that said Letters Patent is hereby corrected as shown below:

In the drawings

Drawing Sheet 8 of 15, Figure 8, line 1, delete "Sysytem" and insert -- System --, therefor.

Drawing Sheet 8 of 15, Figure 8, line 4, delete "Sysytem" and insert -- System --, therefor.

Drawing Sheet 9 of 15, Figure 9, line 1, delete "Sysytem" and insert -- System --, therefor.

In the specification

Column 7, line 20, delete "114A-14B" and insert -- 114A-114B --, therefor.

Column 8, line 58, delete "non-Volatile" and insert -- non-volatile --, therefor.

In the claims

Column 18, line 24, Claim 12, delete "The method of claim 11" and insert -- The system of claim 11 --, therefor.

Column 18, line 33, Claim 14, delete "claim 11," and insert -- claim 13, --, therefor.

Signed and Sealed this
Twentieth Day of October, 2015

Michelle K. Lee
*Director of the United States Patent and Trademark Office*